US012668302B2

(12) United States Patent
Arányi et al.

(10) Patent No.: US 12,668,302 B2
(45) Date of Patent: Jun. 30, 2026

(54) STEER-BY-WIRE STEERING SYSTEM, MOTOR VEHICLE, AND METHOD FOR DETERMINING AN ABSOLUTE STEERING ANGLE

(71) Applicants: thyssenkrupp Presta AG, Eschen (LI); thyssenkrupp AG, Essen (DE)

(72) Inventors: Miklós Arányi, Altstaetten (CH); Imre Szepessy, Mauren (LI)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 25 days.

(21) Appl. No.: 18/891,627

(22) Filed: Sep. 20, 2024

(65) Prior Publication Data

US 2025/0108859 A1    Apr. 3, 2025

(30) Foreign Application Priority Data

Sep. 29, 2023    (BE) ................................... 2023/5804

(51) Int. Cl.
   *B62D 6/00*        (2006.01)
   *B62D 5/00*        (2006.01)
(52) U.S. Cl.
   CPC ............. *B62D 6/008* (2013.01); *B62D 5/006* (2013.01); *B62D 6/002* (2013.01)
(58) Field of Classification Search
   CPC ........ B62D 6/008; B62D 5/006; B62D 6/002; B62D 15/0215; B62D 15/0235; B62D 15/0245
   See application file for complete search history.

(56) References Cited

U.S. PATENT DOCUMENTS

| | | | | |
|---|---|---|---|---|
| 5,930,905 A | * | 8/1999 | Zabler ................. | G01D 5/2451 33/1 PT |
| 11,479,290 B2 | * | 10/2022 | Galehr ................. | B62D 5/005 |
| 2004/0193346 A1 | * | 9/2004 | Sugiyama .............. | B62D 5/046 180/443 |
| 2014/0222291 A1 | * | 8/2014 | Dornhege ................ | B62D 6/10 701/41 |
| 2020/0180689 A1 | * | 6/2020 | Asaka ........................ | G01D 3/08 |
| 2020/0307694 A1 | * | 10/2020 | Toyama ................... | B62D 5/04 |
| 2020/0324807 A1 | * | 10/2020 | Kondo ................. | B62D 5/0424 |
| 2021/0061345 A1 | * | 3/2021 | Galehr ....................... | H02K 1/00 |
| 2022/0001924 A1 | * | 1/2022 | Pádár ....................... | G01B 7/30 |

FOREIGN PATENT DOCUMENTS

| | | |
|---|---|---|
| DE | 195 06 938 A1 | 8/1996 |
| DE | 10 2009 017 054 A1 | 10/2010 |
| DE | 10 2009 039 764 B4 | 3/2011 |

* cited by examiner

*Primary Examiner* — Joseph J Dallo
(74) *Attorney, Agent, or Firm* — thyssenkrupp North America, LLC

(57)        ABSTRACT

A steer-by-wire steering system for a motor vehicle comprises a steering wheel angle detection apparatus, a feedback actuator and a wheel actuator. The wheel actuator has a wheel actuator control device which is communicatively connected to a feedback actuator control device and is designed to calculate an absolute steering angle on the basis of sensor values from at least two first rotational angle sensors on a second gearwheel of the steering wheel angle detection apparatus and sensor values from at least two second rotational angle sensors on a motor shaft of the feedback actuator. A motor vehicle can include such a system and a method for determining an absolute steering angle can use such a system.

11 Claims, 2 Drawing Sheets

STEER-BY-WIRE STEERING SYSTEM, MOTOR VEHICLE, AND METHOD FOR DETERMINING AN ABSOLUTE STEERING ANGLE

CROSS REFERENCE TO RELATED APPLICATION

This application is a U.S. Non-Provisional that claims priority to Belgian Patent Application No. BE 2023/5804, filed Sep. 29, 2023, the entire content of which is incorporated herein by reference.

FIELD

The present disclosure relates to a steer-by-wire steering system for a motor vehicle, to a motor vehicle, and to a method for determining an absolute steering angle in a steer-by-wire steering system for a motor vehicle.

BACKGROUND

In a steer-by-wire steering system, the steered wheels and the steering wheel are electrically coupled, rather than mechanically coupled. The steered wheels are controlled by steering signals. In this case, the respective steering wheel position is captured by a steering angle sensor. The corresponding steering signal causes a steering actuator to change the position of the steered wheels. In order to produce a realistic steering sensation despite the lack of a mechanical connection between the steering wheel and steered wheels, a steer-by-wire steering system may have a feedback actuator which produces an appropriate resistance during steering movements.

The correct method of operation of a steer-by-wire steering system presupposes the determination of the absolute steering angle. In this case, the absolute steering angle is understood as meaning the angle of the steering wheel or of the steering shaft connected thereto over a plurality of revolutions. In contrast to a relative steering angle, which is in a range of ±360°, an absolute steering angle therefore has a greater range of values, for example of up to ±720°.

In addition, for applications in the field of (partially) autonomous driving, a so-called "true-power-on" functionality of the steering angle sensor is often required, which means that the absolute steering angle can already be detected when the system is started, without steering movements first having to be carried out for this purpose.

On account of the highly safety-critical character of a steer-by-wire steering system, it is necessary to be able to determine the absolute steering angle reliably and precisely. Requirements imposed on the system in this regard are predefined by the ASIL classification. The ASIL (Automotive Safety Integrity Level) classification is a scheme defined in ISO 26262 for classifying the risk emanating from system components of a vehicle. Components which are related to the steering system of the vehicle are typically assigned to the highest level (ASIL-D).

Solutions in which the angles of a plurality of rotatable bodies connected to one another are measured in order to determine the absolute steering angle are known in the prior art. For example, DE 195 06 938 A1 discloses an apparatus in which the body, the absolute rotational angle of which is intended to be determined, interacts with two gearwheels. The rotational angles of both gearwheels can be measured using two corresponding rotational angle sensors. The absolute rotational angle of the body can be unambiguously determined from the rotational angles captured in this manner and the ratio of the numbers of teeth of the two gearwheels.

However, additional measures are needed to implement an apparatus, as described above, for measuring the absolute steering angle in a steer-by-wire steering system according to the requirements formulated in ASIL-D. The requirements according to ASIL-B already mean that each of the captured rotational angles is not captured by a single sensor, but rather by two corresponding sensors, the sensor values from which are compared with one another. Four rotational angle sensors, the signals from which must be transmitted to a corresponding control device, would therefore be required. This increases the complexity of the interface on the control device and the utilization of the communication path in the vehicle.

Some embodiments include an improved steer-by-wire steering system which is designed to determine the absolute steering angle when the system is started. Some embodiments include a corresponding motor vehicle and a method for determining an absolute steering angle.

BRIEF DESCRIPTION OF THE FIGURES

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
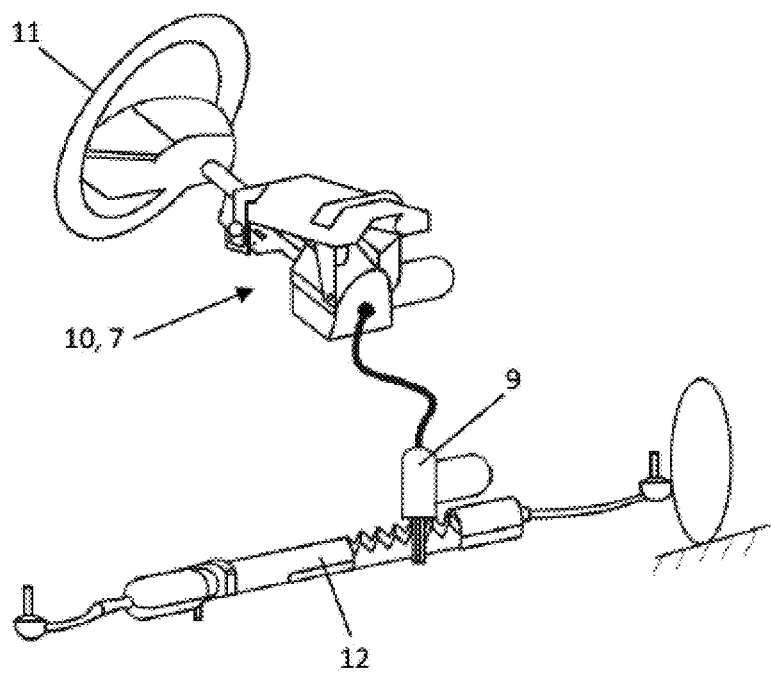
FIG. 1 shows a schematic view of a steer-by-wire steering system in accordance with one exemplary embodiment.

In this case, the absolute steering angle is understood as meaning the angle of the steering wheel or of the steering shaft connected thereto over a plurality of revolutions. In contrast to a relative steering angle, which is in a range of ±360°, an absolute steering angle therefore has a greater range of values, for example of up to ±720°.

The determination of the (absolute) steering angle when the system is started may be understood as meaning the already mentioned "true-power-on" functionality. In this case, the (absolute) steering angle can already be detected when the system is started without steering movements first having to be carried out.

Some embodiments include a steer-by-wire steering system for a motor vehicle. The steer-by-wire steering system has a steering wheel angle detection apparatus, a feedback actuator and a wheel actuator.

In this case, the steering wheel angle detection apparatus has the following:

- a first gearwheel which is directly connected to a steering wheel of the motor vehicle;
- a second gearwheel which is in engagement with the first gearwheel; and
- at least two first rotational angle sensors which are designed to detect a rotational angle of the second gearwheel.

In the context of this disclosure, "directly connected" is understood as meaning the fact that the respective bodies are coupled to one another in such a manner that one revolution of one body corresponds exactly to one revolution of the other body.

The feedback actuator has the following:

a servomotor with a motor shaft and a magnet fastened thereto, wherein the motor shaft is directly connected to the first gearwheel;

at least two second rotational angle sensors which are designed to detect a rotational angle of the motor shaft by means of the magnet; and a feedback actuator control device which is designed to receive sensor signals from the at least two second rotational angle sensors.

The wheel actuator has a wheel actuator control device which is communicatively connected to the feedback actuator control device and is designed to calculate an absolute steering angle on the basis of sensor values from the at least two first rotational angle sensors and the sensor values from the at least two second rotational angle sensors. Alternatively or additionally, the feedback actuator control device is also designed to calculate the absolute steering angle.

The steer-by-wire steering system described herein has the advantage that there is no need for a pair of rotational angle sensors on the first gearwheel in the steering wheel angle detection apparatus so that the absolute steering angle can be determined from the rotational angle of the first gearwheel and the rotational angle of the second gearwheel. Instead, at least two second rotational angle sensors of the feedback actuator are used to determine a rotational angle of the motor shaft that is driven by the servomotor of the feedback actuator. In this case, the motor shaft is directly connected to the first gearwheel which is in turn directly connected to the steering wheel. Therefore, one revolution of the steering wheel corresponds exactly to one revolution of the motor shaft of the servomotor in the feedback actuator. In this case, the wheel actuator control device is designed to determine the absolute steering angle on the basis of the following rotational angles: the rotational angle of the second gearwheel of the steering wheel angle detection apparatus, which is determined by the at least two first rotational angle sensors; and the rotational angle of the motor shaft of the feedback actuator, which is determined by the at least two second rotational angle sensors.

Using rotational angle sensors or rotor position sensors of the feedback actuator to determine the absolute rotational angle therefore makes it possible to dispense with additional sensors in the region of the steering wheel angle detection apparatus.

Using redundant sensors to capture the rotational angles (at least two rotational angle sensors in each case) means that the steer-by-wire steering system described herein is suitable for meeting the requirements according to ASIL-B. Assuming a corresponding design of the wheel actuator control device, the steer-by-wire steering system can meet the requirements according to ASIL-D.

The feedback actuator control device is advantageously communicatively connected to the wheel actuator control device, wherein the control devices can transmit received sensor information to the other control device in each case.

The feedback actuator control device is preferably designed to calculate the absolute steering angle, in particular according to the Nonius principle (or Vernier principle). In this case, the absolute rotational angle is determined on the basis of the following variables:

the captured rotational angle at the second gearwheel;

the captured rotational angle of the motor shaft at the servomotor (corresponds to the rotational angle of the first gearwheel); and the (fixed) transmission ratio between the first and second gearwheels.

This makes it possible to calculate the absolute steering angle with high precision. In addition, the true-power-on functionality is ensured, that is to say the absolute steering angle can be calculated when the system is started without the need for steering movements for setting the sensors.

The feedback actuator control device and/or the wheel actuator control device can preferably have at least two, preferably identical, control device units. Both control device units are preferably supplied with power independently of one another. In this manner, the respective control device may have two redundant units which are functionally identical. For example, a first unit may be connected to a first of the at least two rotational angle sensors and a second unit may be connected to a second of the at least two rotational angle sensors. Such a structure increases the failure safety of the control device and makes it possible to meet requirements according to ASIL.

The at least two first rotational angle sensors are preferably communicatively connected to the wheel actuator control device via a SENT bus. SENT (Single Edge Nibble Transmission) is a digital serial interface. A SENT bus provides a simple possible way of transmitting sensor data between sensors and control devices with high precision.

The feedback actuator control device is preferably communicatively connected to the wheel actuator control device via a CAN bus. A CAN bus (Controller Area Network) is a widespread bus system for communication of control devices in the vehicle. This has the advantage that the control device communication of the steer-by-wire steering system can be implemented using standard solutions.

Some embodiments include a motor vehicle having a steer-by-wire steering system as described above.

Some embodiments include a method for determining an absolute steering angle in a steer-by-wire steering system as described above. The method comprises the following steps:

capturing a first rotational angle of the second gearwheel;

capturing a second rotational angle of the motor shaft;

calculating an absolute steering angle on the basis of the first rotational angle and the second rotational angle.

A method for determining an absolute steering angle in a steer-by-wire steering system for a motor vehicle is therefore proposed, in particular, wherein the steer-by-wire steering system has a steering wheel angle detection apparatus, a feedback actuator and a wheel actuator, wherein the steering wheel angle detection apparatus has the following:

a first gearwheel which is directly connected to a steering wheel of the motor vehicle;

a second gearwheel which is in engagement with the first gearwheel; and at least two first rotational angle sensors which are designed to detect a rotational angle of the second gearwheel, wherein the feedback actuator has the following:

a servomotor with a motor shaft and a magnet fastened thereto, wherein the motor shaft is directly connected to the first gearwheel;

at least two second rotational angle sensors which are designed to detect a rotational angle of the motor shaft by means of the magnet; and a feedback actuator control device which is designed to receive sensor signals from the at least two second rotational angle sensors, wherein the wheel actuator has a wheel actuator control device which is communicatively connected to the feedback actuator control device, and wherein the method comprises the following steps:

capturing a first rotational angle of the second gearwheel;

capturing a second rotational angle of the motor shaft;

calculating an absolute steering angle on the basis of the first rotational angle and the second rotational angle.

In this case, the absolute steering angle is determined, in particular, by means of the wheel actuator control device. Alternatively or additionally, the absolute steering angle can be advantageously determined by means of the feedback actuator control device.

The advantages mentioned in connection with the steer-by-wire steering system accordingly also apply to the motor vehicle described herein and the method. The features described in this context are also disclosed in connection with the motor vehicle and the method and vice versa. In particular, the method is suitable for calculating the absolute steering angle in the steer-by-wire steering system. Vice versa, the steer-by-wire steering system is designed to carry out the corresponding method steps.

The absolute steering angle is preferably calculated according to the Nonius principle (or Vernier principle). This affords the advantage that the absolute steering angle is calculated with high precision. In addition, the calculation method presupposes no reference steering movements, thus making it possible to implement a true-power-on function-ality.

The calculation of the absolute steering angle preferably comprises the addition of a centre position offset value and/or a horizontal steering wheel offset value. This makes it possible to take into account additional parameters of the steering system, which further increases the precision of the absolute steering angle calculated.

FIG. 1 shows some components of a steer-by-wire steer-ing system described herein in accordance with one exem-plary embodiment. The components of the steering system are described if they are needed for understanding.

The steer-by-wire steering system has a steering wheel 11 which is connected to a steering wheel angle detection apparatus 10 and a feedback actuator 7 via a steering shaft.

The steer-by-wire steering system also has a wheel actua-tor 9 with a control device which is communicatively connected to a control device of the feedback actuator 7 and is also designed to receive sensor values from the steering wheel angle detection apparatus 10.

The control device of the wheel actuator 9 is designed to calculate the absolute steering angle, which is set by a driver at the steering wheel 11, and to accordingly drive the rack 17 in order to steer the vehicle.

Some embodiments are not restricted to steering wheels, but can generally be applied to steering elements, that is to say also to other steering means such as handlebars. Steering elements are likewise generally included in addition to the steering wheel described above. Some embodiments are also not restricted to the man-machine interface, but rather also comprise steering systems which enable autonomous driv-ing.

Figure 2:
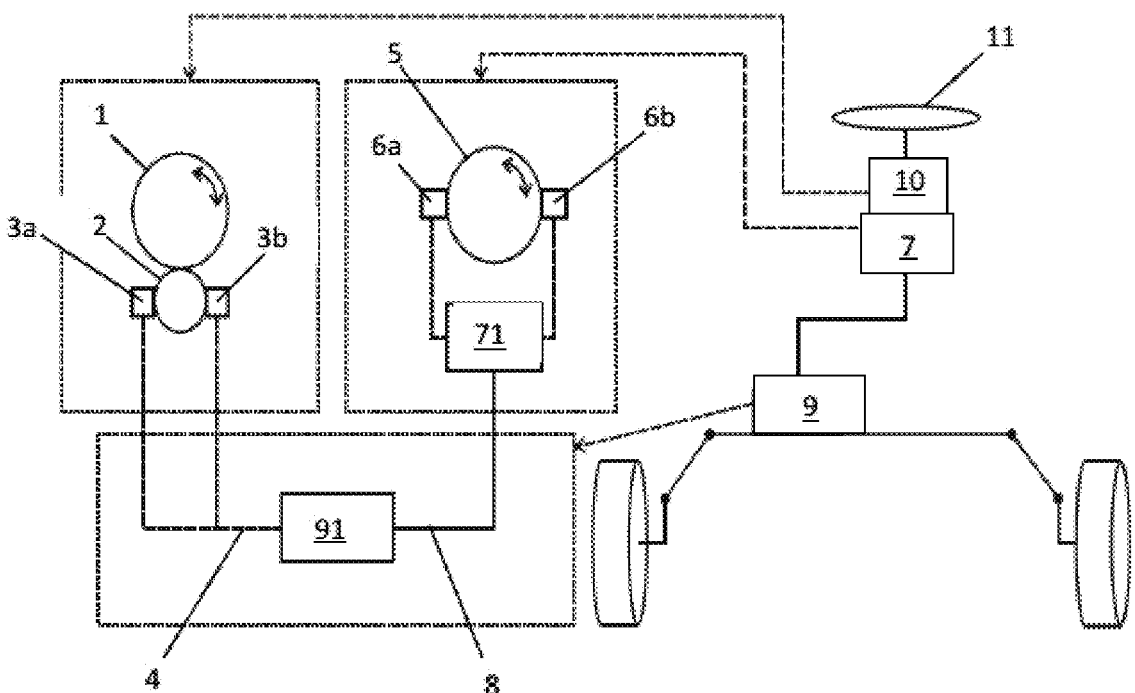
FIG. 2 shows a schematic view of the steer-by-wire steering system in accordance with one exemplary embodiment in a greater degree of detail.

FIG. 2 shows some components of the steer-by-wire steering system described herein in accordance with one exemplary embodiment, in particular the steering wheel angle detection apparatus 10, the feedback actuator 7 and the wheel actuator 9, in a greater degree of detail.

The steering wheel angle detection apparatus 10 therefore has a first gearwheel 1 which is directly connected to the steering wheel 11, for example via a steering shaft. In this manner, one revolution of the steering wheel 11 corresponds exactly to one revolution of the first gearwheel 1. The steering wheel angle detection apparatus 10 also has a second gearwheel 2 which is in engagement with the first gearwheel 1 and has a smaller number of teeth than the first gearwheel 1. The first gearwheel 1 and the second gearwheel 2 therefore form a transmission with a fixed transmission ratio. Two rotational angle sensors 3a, 3b which measure a position or the rotational angle of the second gearwheel 2 are arranged on the second gearwheel 2. The rotational angle sensors 3a, 3b may operate in a magnet-based manner, for example.

The feedback actuator 7 has a servomotor with a motor shaft 5 which is directly connected to the first gearwheel 1. One revolution of the first gearwheel 1 (or of the steering wheel 11) therefore corresponds exactly to one revolution of the motor shaft 5. The rotor position sensors or rotational angle sensors 6a, 6b can detect the rotational angle of the motor shaft 5 using a magnet (not illustrated) which is fastened to the motor shaft 5. The feedback actuator control device 71 receives the sensor values from the rotational angle sensors 6a, 6b.

The wheel actuator 9 has a wheel actuator control device 91 which is connected to the first rotational angle sensors 3a, 3b of the steering wheel angle detection apparatus 10 via a SENT bus 4 and is also connected to the feedback actuator control device 71 via a CAN bus 8. In this manner, the wheel actuator control device 91 can receive the sensor values from the rotational angle sensors 3a, 3b and 6a, 6b and can calculate the absolute steering angle on the basis thereof and on the basis of the fixed transmission ratio of the gearwheels 1, 2. The feedback actuator control device can advanta-geously receive sensor values from the rotational angle sensors 3a, 3b and 6a, 6b in a corresponding manner and can calculate the absolute steering angle on the basis thereof and on the basis of the fixed transmission ratio of the gearwheels 1, 2.

Figure 3:
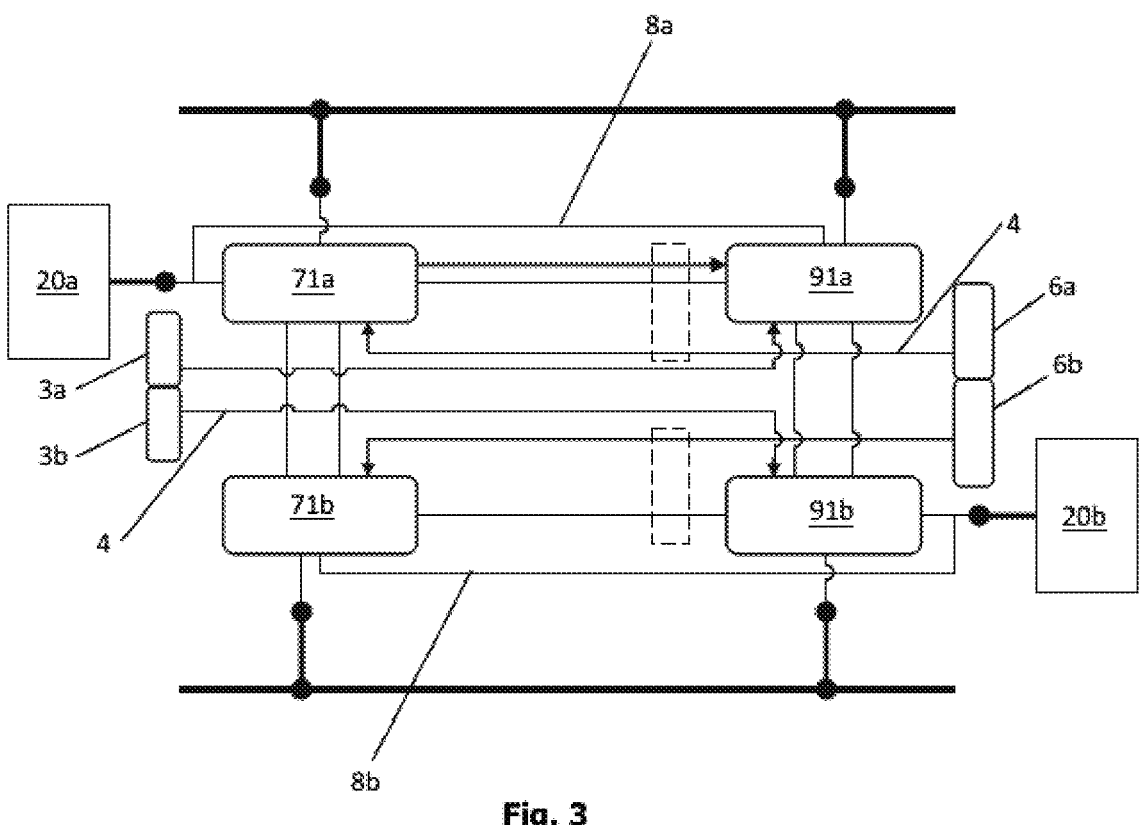
FIG. 3 shows a schematic view of the communication connections in the steer-by-wire steering system in accordance with one exemplary embodiment.

FIG. 3 shows a schematic view of the communication connections in a steer-by-wire steering system described herein in accordance with one exemplary embodiment. In the exemplary embodiment shown, redundant units, com-munication connections and power supply units for the control devices involved are provided.

Specifically, the feedback actuator control device is formed from two redundant units 71a, 71b. The feedback actuator control device unit 71a is supplied with power by the power supply unit 20a and receives the sensor values from the first rotational angle sensor 6a. The feedback actuator control device unit 71b is supplied with power by the power supply unit 20b, which is independent of the power supply unit 20a, and receives the sensor values from the first rotational angle sensor 6b.

The wheel actuator control device is formed from two redundant units 91a, 91b. The wheel actuator control device unit 91a is supplied with power by the power supply unit 20a and is connected to the feedback actuator control device unit 71a via the CAN bus 8a in order to receive the sensor values from the first rotational angle sensor 6a. The wheel actuator control device unit 91b is supplied with power by the power supply unit 20b and is connected to the feedback actuator control device unit 71*b* via the CAN bus 8*b* in order to receive the sensor values from the first rotational angle sensor 6*b*.

As a result of the redundant design of the control device units, sensors and communication paths and the independent power supplies, the steer-by-wire steering system provides increased failure safety, in particular with regard to the requirements according to ASIL-B and ASIL-D.

LIST OF REFERENCE SIGNS

1 First gearwheel
2 Second gearwheel
3*a*, 3*b* First rotational angle sensors
4 SENT bus
5 Motor shaft
6*a*, 6*b* Second rotational angle sensors
7 Feedback actuator
8 CAN bus
9 Wheel actuator
10 Steering wheel angle detection apparatus
11 Steering wheel
12 Rack
20*a*, 20*b* Power supplies
71 Feedback actuator control device
71*a*, 71*b* Feedback actuator control device units
91 Wheel actuator control device
91*a*, 91*b* Wheel actuator control device units

The invention claimed is:

1. A steer-by-wire steering system for a motor vehicle, comprising:
  a steering wheel;
  a steering wheel angle detection apparatus coupled to the steering wheel so as to detect an angle of rotation of the steering wheel;
  a feedback actuator coupled to the steering wheel so as to provide a resistance to rotation of the steering wheel during steering movements; and
  a wheel actuator coupled to steered wheels of the motor vehicle so as to steer the steered wheels during steering movements;
  wherein the steering wheel angle detection apparatus includes:
    a first gearwheel which is directly connected to the steering wheel;
    a second gearwheel which is in engagement with the first gearwheel; and
    at least two first rotational angle sensors which are designed to detect a rotational angle of the second gearwheel;
  wherein the feedback actuator includes:
    a servomotor with a motor shaft and a magnet fastened thereto, wherein the motor shaft is directly connected to the first gearwheel;
    at least two second rotational angle sensors which are designed to detect a rotational angle of the motor shaft using the magnet; and
    a feedback actuator control device which is designed to receive sensor signals from the at least two second rotational angle sensors;
  wherein the wheel actuator has a wheel actuator control device which is communicatively connected to the feedback actuator control device and is designed to calculate an absolute steering angle on the basis of sensor values from the at least two first rotational angle sensors and the sensor values from the at least two second rotational angle sensors.

2. The steer-by-wire steering system according to claim 1, wherein the feedback actuator control device is designed to calculate the absolute steering angle.

3. The steer-by-wire steering system according to claim 2, wherein the feedback actuator control device is designed to calculate the absolute steering angle according to the Nonius principle.

4. The steer-by-wire steering system according to claim 1, wherein the feedback actuator control device and/or the wheel actuator control device has/have at least two control device units.

5. The steer-by-wire steering system according to claim 1, wherein the at least two first rotational angle sensors are communicatively connected to the wheel actuator control device via a SENT bus.

6. The steer-by-wire steering system according to claim 1, wherein the feedback actuator control device is communicatively connected to the wheel actuator control device via a CAN bus.

7. A motor vehicle having a steer-by-wire steering system according to claim 1.

8. A method for determining an absolute steering angle in a steer-by-wire steering system for a motor vehicle,
  wherein the steer-by-wire steering system has a steering wheel, a steering wheel angle detection apparatus coupled to the steering wheel so as to detect an angle of rotation of the steering wheel, a feedback actuator coupled to the steering wheel so as to provide a resistance to rotation of the steering wheel during steering movements, and a wheel actuator coupled to steered wheels of the motor vehicle so as to steer the steered wheels during steering movements,
  wherein the steering wheel angle detection apparatus has the following:
    a first gearwheel which is directly connected to the steering wheel;
    a second gearwheel which is in engagement with the first gearwheel; and
    at least two first rotational angle sensors which are designed to detect a rotational angle of the second gearwheel,
  wherein the feedback actuator has the following:
    a servomotor with a motor shaft and a magnet fastened thereto, wherein the motor shaft is directly connected to the first gearwheel;
    at least two second rotational angle sensors which are designed to detect a rotational angle of the motor shaft using the magnet; and
    a feedback actuator control device which is designed to receive sensor signals from the at least two second rotational angle sensors,
  wherein the wheel actuator has a wheel actuator control device which is communicatively connected to the feedback actuator control device,
  wherein the method comprises:
    capturing a first rotational angle of the second gearwheel;
    capturing a second rotational angle of the motor shaft; and
    calculating an absolute steering angle on the basis of the first rotational angle and the second rotational angle.

9. The method according to claim 8, wherein the absolute steering angle is calculated according to the Nonius principle.

10. The method according to claim 8, wherein the calculation of the absolute steering angle comprises the addition of a center position offset value and/or a horizontal steering wheel offset value.

11. The steer-by-wire steering system according to claim 1, wherein the feedback actuator control device and/or the wheel actuator control device has/have at least two identical control device units which are independently supplied with power.

\* \* \* \* \*